(12) United States Patent
Ossig et al.

(10) Patent No.: US 9,645,240 B1
(45) Date of Patent: May 9, 2017

(54) METHOD FOR OPTICALLY SCANNING AND MEASURING AN ENVIRONMENT

(71) Applicant: FARO Technologies, Inc., Lake Mary, FL (US)

(72) Inventors: Martin Ossig, Tamm (DE); Daniel Flohr, Stuttgart (DE); Dag Frommhold, Neuffen (DE); Oliver Knörzer, Korntal-Muenchingen (DE); Martin Heide, Stuttgart (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 15/419,334

(22) Filed: Jan. 30, 2017

Related U.S. Application Data

(63) Continuation-in-part of application No. 15/140,909, filed on Apr. 28, 2016, which is a continuation of
(Continued)

(30) Foreign Application Priority Data

May 10, 2010 (DE) .................. 10 2010 020 925

(51) Int. Cl.
*G01B 11/30* (2006.01)
*G01S 17/89* (2006.01)
(Continued)

(52) U.S. Cl.
CPC ............ *G01S 17/89* (2013.01); *G01S 7/4808* (2013.01); *G01S 7/4817* (2013.01); *G01S 7/51* (2013.01)

(58) Field of Classification Search
CPC .................................. G01B 11/30; G01V 8/00
(Continued)

(56) References Cited

U.S. PATENT DOCUMENTS 5,212,738 A     5/1993  Chande et al.
5,337,149 A  *  8/1994  Kozah .................. G01C 15/002
                                                   356/139.03
(Continued)

OTHER PUBLICATIONS

International Search Report and Written Opinion for International Application No. PCT/EP2011/001662 dated May 26, 2011; 3 pages.

*Primary Examiner* — Roy M Punnoose
(74) *Attorney, Agent, or Firm* — Cantor Colburn LLP

(57) ABSTRACT

A method for optically scanning, measuring and displaying a point cloud is provided. The method includes emitting, by a laser scanner, an emission light beam and receiving a reflection light beam that is reflected from an object. A control device determines for measurement points projected on a plane corresponding to a screen, wherein at least some measurement points are displayed on a display device. One or more pixels are gap filled to generate a visual appearance of a surface on the display device. Wherein the gap filling includes a first horizontal search in a first direction of a first measured point of the measurement points followed by a second horizontal search in a second direction of the first measured point. The gap filling further includes a first vertical search in a third direction of the measured point, followed by a second vertical search in a fourth direction.

10 Claims, 14 Drawing Sheets

Related U.S. Application Data application No. 13/697,031, filed as application No. PCT/EP2011/001662 on Apr. 1, 2011, now Pat. No. 9,329,271.

(60) Provisional application No. 61/362,810, filed on Jul. 9, 2010.

(51) Int. Cl.
  *G01S 7/51* (2006.01)
  *G01S 7/48* (2006.01)
  *G01S 7/481* (2006.01)

(58) Field of Classification Search
  USPC .......................................... 356/601, 607, 608
  See application file for complete search history.

(56) References Cited

U.S. PATENT DOCUMENTS

| | | | |
|---|---|---|---|
| 5,577,130 A | 11/1996 | Wu | |
| 5,956,661 A | 9/1999 | Lefebvre et al. | |
| 6,480,270 B1 | 11/2002 | Studnicka et al. | |
| 6,542,249 B1 * | 4/2003 | Kofman | G01B 11/2513 356/601 |
| 6,922,234 B2 * | 7/2005 | Hoffman | G01C 3/08 356/141.1 |
| 7,403,268 B2 * | 7/2008 | England | G01C 15/002 356/4.01 |
| 7,477,359 B2 * | 1/2009 | England | G01S 7/51 356/4.01 |
| 7,477,360 B2 * | 1/2009 | England | G06T 11/60 356/4.01 |
| 7,551,771 B2 | 6/2009 | England, III | |
| 7,777,761 B2 * | 8/2010 | England | G01S 17/89 345/619 |
| 7,847,922 B2 * | 12/2010 | Gittinger | F41J 5/00 356/141.5 |
| 7,974,461 B2 | 7/2011 | England | |
| 8,384,914 B2 * | 2/2013 | Becker | G01C 15/002 356/141.5 |
| 2005/0141052 A1 * | 6/2005 | Becker | G02B 26/10 358/475 |
| 2006/0193521 A1 | 8/2006 | England, III et al. | |
| 2007/0064976 A1 | 3/2007 | England, III | |
| 2010/0195086 A1 * | 8/2010 | Ossig | G01S 7/491 356/5.01 |
| 2012/0133953 A1 * | 5/2012 | Ossig | G01S 7/497 356/601 |

* cited by examiner

| x | 1 | 1 | 1 | x |   |   |
|---|---|---|---|---|---|---|
| x | 2 | 2 | 2 | 2 |   |   |
| x | 2 | 2 | 2 | 2 |   |   |
| x | 1 | 1 | x | 1 | x |   |
|   | 2 | 4 | 4 | 4 | 4 |   |
|   | 2 | 3 | 3 | 3 | 3 | x |
|   | x |   |   |   |   |   |

FIG. 16

METHOD FOR OPTICALLY SCANNING AND MEASURING AN ENVIRONMENT

CROSS REFERENCE TO RELATED APPLICATIONS

The present application is a continuation-in-part application of U.S. application Ser. No. 15/140,909 filed on Apr. 28, 2016, which is a continuation application of U.S. application Ser. No. 13/697,031 filed on Apr. 29, 2013. U.S. application Ser. No. 13/697,031 is a National Stage Application of PCT Application No. PCT/EP2011/001662, filed on Apr. 1, 2011, which claims the benefit of U.S. Provisional Patent Application No. 61/362,810, filed on Jul. 9, 2010, and of pending German Patent Application No. DE 10 2010 020 925.2, filed on May 10, 2010, and which are hereby incorporated by reference.

BACKGROUND

The invention relates to a system and method for optically scanning and measuring an environment, and in particular, to a system and method for generating a display image from a point cloud.

Metrology devices, such as laser scanners for example, may generate large volumes of coordinate data of points located on the surfaces of the scanned area. These types of devices may be used to generate three-dimensional models of an area, such as a home or building, a crime scene, or an archeological site for example. Often with these types of scans, the data may be acquired from multiple positions to capture all of the desired surfaces and avoid having blank areas where a surface was in the "shadow" of another object. As a result in several data-sets of coordinate data are generated that are registered together to define a single data-set, sometimes colloquially referred to as a "point cloud" since the data is represented as a group of points in space without surfaces.

It should be appreciated that from a graphical display of a point cloud, it may be difficult to visualize the surfaces of the scanned area. This is due to the close proximity of points (from any user point of view) within the point cloud that may lie on different planes. For example, if the user point of view of the point cloud is looking down on a table, there will be points within the field of view from the table surface, along with the floor that is underneath the table surface or even the surface on the underside of the table.

Where the point cloud is relatively dense, meaning that the points on a surface are dense, the generation of surfaces in the displayed image for visualizing the scanned area may be created, albeit computationally intensive. However, in some applications, the point cloud may have a lower density of points resulting in gaps in the data set between the points of the point cloud. As a result, it may be difficult to generate a desired displayed image.

Accordingly, while existing metrology devices and point cloud display systems are suitable for their intended purposes the need for improvement remains, particularly in providing a system for filling in pixels on a graphical display to generate a displayed image of a point cloud.

SUMMARY

According to an embodiment of the present invention a method for optically scanning, measuring and displaying a point cloud is provided. The method includes emitting, by a light emitter of a laser scanner, an emission light beam. A light receiver receives a reflection light beam, wherein a reflection light beam of the emission light beam is reflected from an object. A control and evaluation device determines for measurement points projected on a plane corresponding to a screen on a display device, at least the distance from the object to a center of the laser scanner, wherein at least some measurement points are displayed on the display device. The points are visible are determined on the display device based at least in part on a viewpoint of the display device. One or more pixels are gap filled to generate a visual appearance of a surface on the display device. Wherein the gap filling includes a first horizontal search in a first direction of a first measured point of the measurement points followed by a second horizontal search in a second direction of the first measured point, the second direction being opposite the first direction. The gap filling further includes a first vertical search in a third direction of the measured point, the third direction being perpendicular to the first direction, followed by a second vertical search in a fourth direction, the fourth direction being opposite the third direction.

BRIEF DESCRIPTION OF THE DRAWINGS

Embodiments of the present invention are explained in more detail below on the basis of exemplary embodiments illustrated in the drawings, in which

Figure 16:
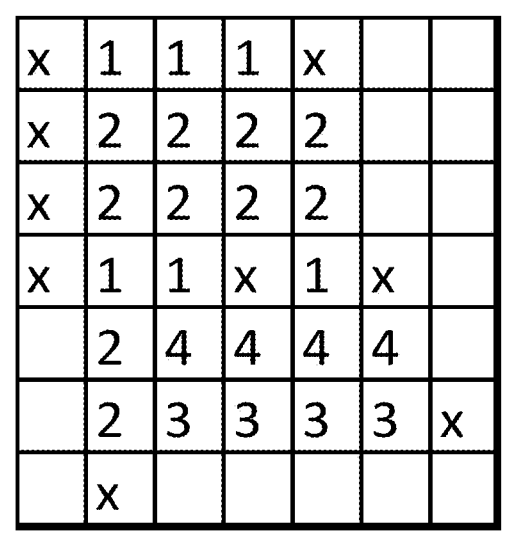

FIG. 12-FIG. 16 are schematic illustrations of a sequence of horizontal and vertical pixel filling steps performed using the methods of FIG. 6;

DETAILED DESCRIPTION

Figure 1:
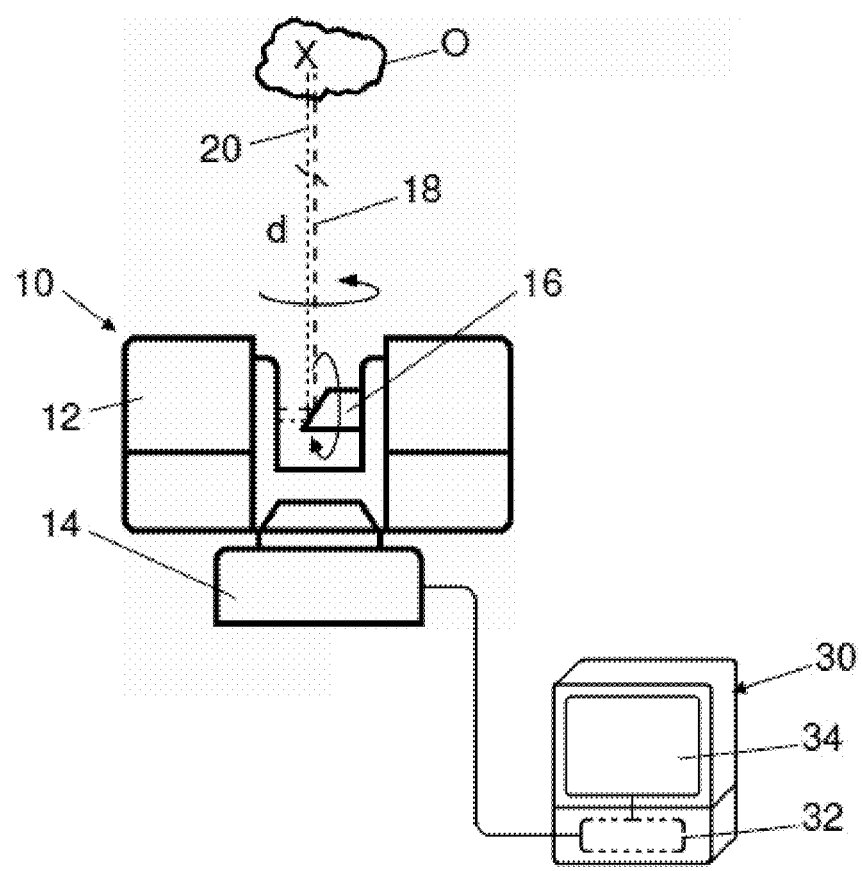
FIG. 1 is a schematic illustration of a laser scanner in the environment including a display device.
Figure 2:
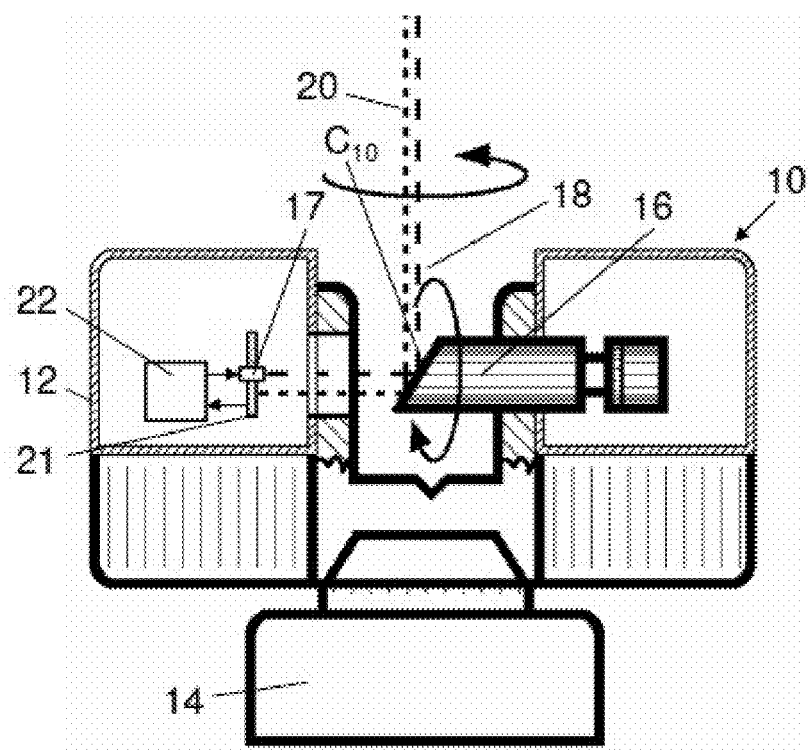
FIG. 2 is a partial sectional illustration of the laser scanner.

Referring to FIG. 1 and FIG. 2, a laser scanner 10 is provided as a device for optically scanning and measuring the environment of the laser scanner 10. The laser scanner 10 has a measuring head 12 and a base 14. The measuring head 12 is mounted on the base 14 as a unit that can be rotated about a vertical axis. The measuring head 12 has a rotary mirror 16 that can be rotated about a horizontal axis. The point of intersection between the two axes of rotation is designated as the center $C_{10}$ of the laser scanner 10.

The measuring head 12 also has a light emitter 17 for emitting an emission light beam 18. The emission light beam 18 may be a laser beam in the range of wavelength of approximately 300 to 1600 nm, for example, 790 nm, 905 nm or less than 400 nm, but other electro-magnetic waves having, for example, a greater wavelength can be used. The emission light beam 18 may be amplitude-modulated with, for example, a sinusoidal or rectangular-waveform modulation signal. The emission light beam 18 is passed from the light emitter 17 onto the rotary mirror 16 where it is deflected and then emitted into the environment. A reception light beam 20, which is reflected by or otherwise scattered from an object O, is captured again by the rotary mirror 16, deflected and passed onto a light receiver 21. The direction of the emission light beam 18 and of the reception light beam 20 results from the angular positions of the rotary mirror 16 and the measuring head 12, which depend on the positions of their respective rotary drives which are, in turn, detected by a respective angular encoder.

A control and evaluation device 22 has a data link connection to the light emitter 17 and to the light receiver 21 in the measuring head 12, parts thereof being arranged also outside the measuring head 12, for example as a computer connected to the base 14. The control and evaluation device 22 determines, for a multiplicity of measurement points X, the distance d of the laser scanner 10 from the illuminated point on the object O (e.g. the table T, FIG. 3), and from the propagation times of emission light beam 18 and reception light beam 20. In an embodiment, the distance d is determined by the control and evaluation device 22 based on the phase shift between the two light beams 18 and 20. In another embodiment, the distance d is determined by the control and evaluation device based on a measured round trip time between an outgoing emission pulse of light 18 and a returning reception pulse of light 20. In another embodiment, the distance d is determine by the control and evaluation device based on change in optical wavelength of a reception beam of light 20 relative to an emission beam of light, the emission beam of light having an optical wavelength that is linearly swept (chirped) in time. Many other methods are known in the art and may be used to determine the distance d.

Through use of the relatively rapid rotation of the mirror 16, scanning takes place along a circular line. Also, through use of the relatively slow rotation of the measuring head 12 relative to the base 14, the entire space is gradually scanned with the circular lines. The totality of the measurement points X of such a measurement may be referred to as a scan. The center $C_{10}$ of the laser scanner 10 defines for such a scan the origin of the local stationary reference system. The base 14 is stationary in this local stationary reference system. In other embodiments, a different type of beam steering method is used to direct the emission beam 18 to different points X in the environment. In an embodiment, a pair of galvanometer steering mirrors are used to rapidly direct the emission beam 18 to desired points X. In another embodiment, the emission beam 18 rotates along with the entire measuring head 12. Many types of beam steering mechanisms are known in the art and may be used.

In addition to the distance d to the center $C_{10}$ of the laser scanner 10, each measurement point X comprises a brightness value which may also be determined by the control and evaluation device 22. Here the term brightness may be understood to refer to a level of optical power or a level of irradiance (optical power per unit area). The brightness is a gray-tone value which is determined, for example, by integration of the bandpass-filtered and amplified signal of the light receiver 21 over a measuring period which is assigned to the measurement point X. Through use of a color camera, it is optionally possible to generate pictures, by which colors (R, G, B) can be assigned as a value to the measurement points X in addition to the brightness or comprising the brightness.

A display device 30 is connected to the control and evaluation device 22. The display device 30 can be integrated into the laser scanner 10, for example into the measuring head 12 or into the base 14, or it can be an external unit, for example part of a computer which is connected to the base 14. The display device 30 has a graphics card 32 and a screen 34 which can be arranged separately from one another or as a structural unit. The control and evaluation device 22 provides 3D data of the scan.

It should be appreciated that when the measurement points X, which are positioned in a three-dimensional space, are displayed on a two-dimensional display device 30, it may be difficult for the user to visualize the object O on the display. For example, referring to FIG. 3 a table T has been scanned with the laser scanner 10 and the measurement points X have been acquired. When the user displays the measurement points X from a viewpoint V, the user will see not only the measurement points $X_T$ from the tabletop, but also the measurement points $X_F$. As a result, without a visual reference such as a surface of the table T or the surfaces of the legs of the table, it will be difficult for the user to distinguish between the measurement points $X_T$ and the measurement points $X_F$. It should be appreciated that in an embodiment where the measured object O is a structure, such as the inside of a building and the measured points may be on opposite sides of a wall. Accordingly, embodiments herein provide advantages generating on display device 30 an image representing surfaces on the object O by filling in the pixels between measured points. The method of filling in the pixels between the measured points may sometimes be referred to a gap filling or pixel filling.

Figure 3:
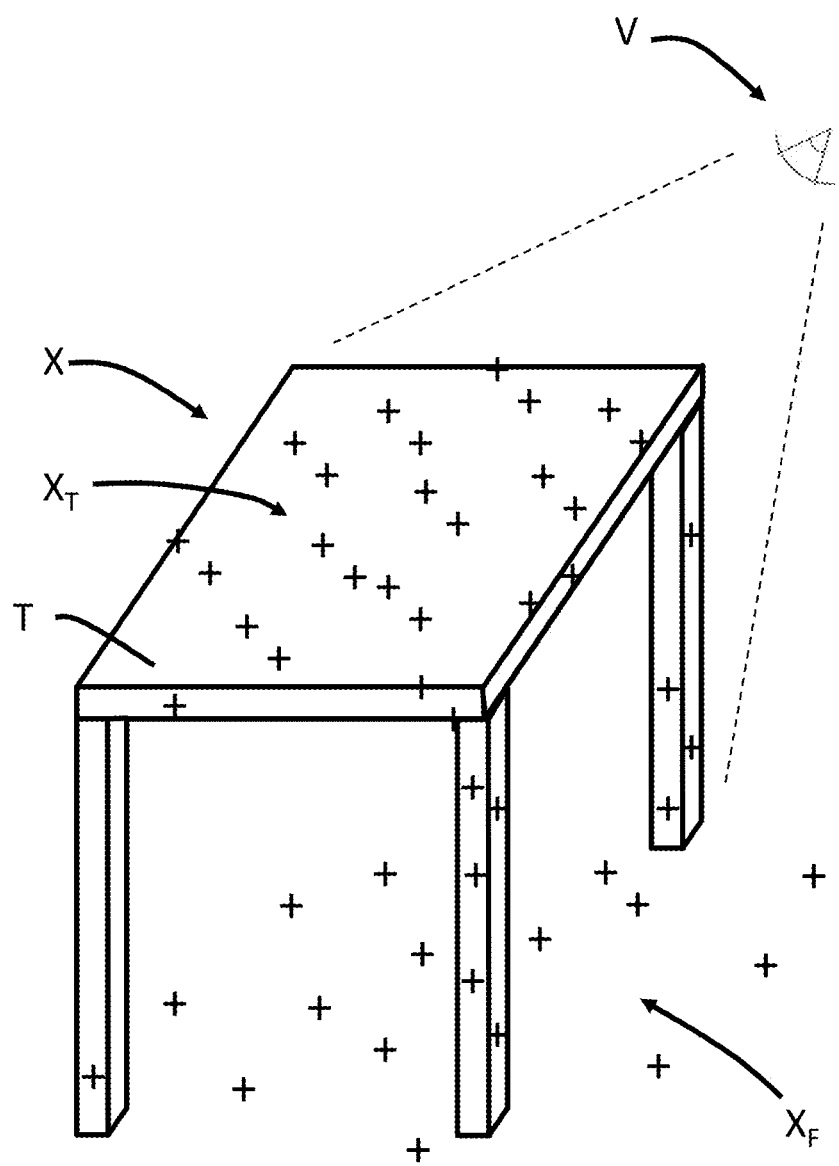
FIG. 3 is a schematic illustration of a scanned area with measured points shown on surfaces.
Figure 4:
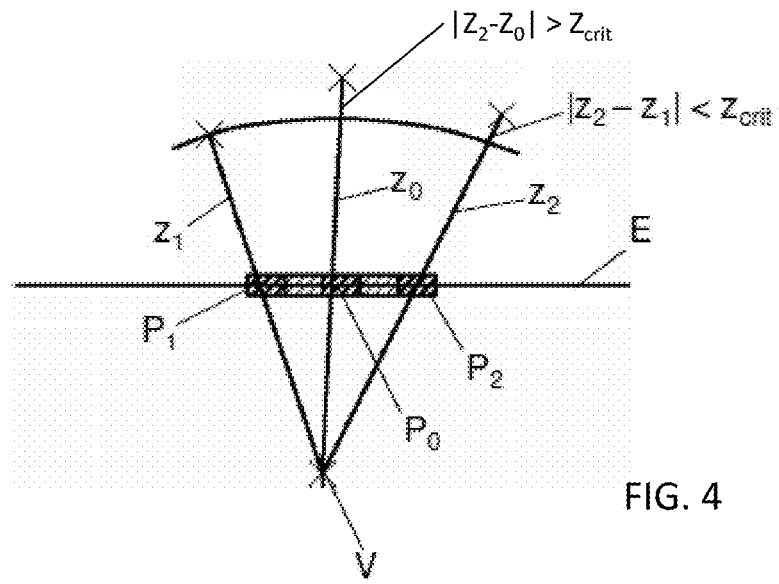
FIG. 4 is a schematic illustration of the assignment and filling of the pixels with a view onto the plane, wherein the adjacent pixels are on the same surface.
Figure 5:
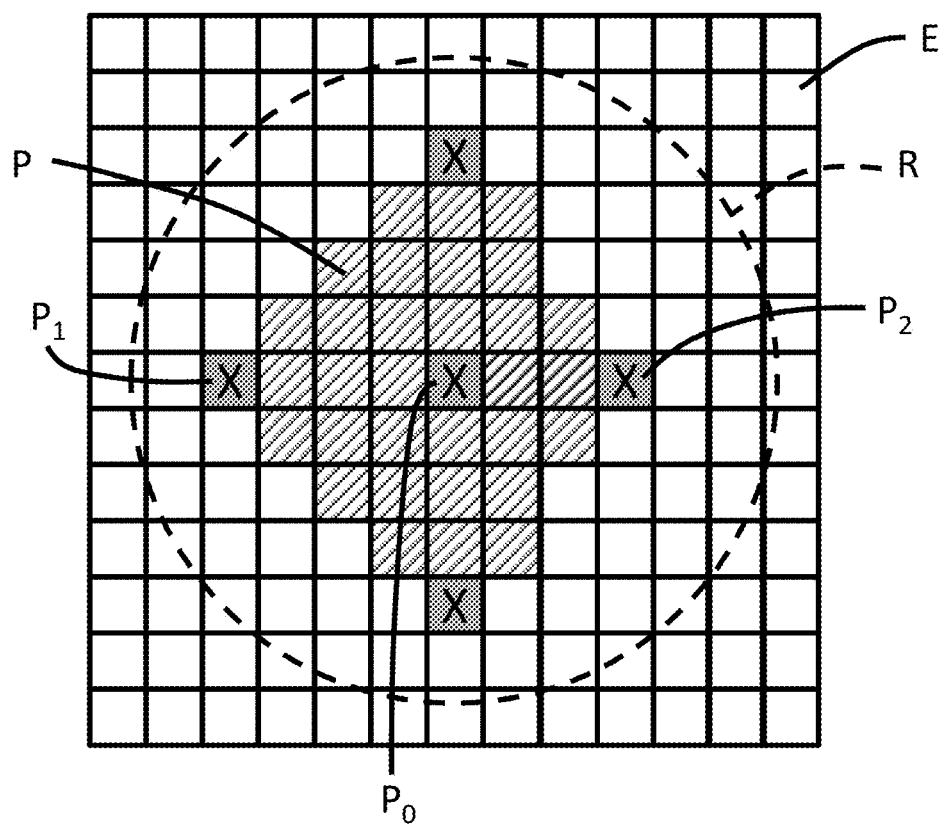
FIG. 5 is a schematic illustration of the assignment and filling of the pixels, according to FIG. 4, with a view onto the plane, in accordance with an embodiment.

In many cases, objects in an environment are scanned with a laser scanner 10 placed in a plurality of locations. This is illustrated in FIG. 3, where a scanner 10A is located at a first location at a first time and the same or different scanner 10B is located at a different location at a second time. In some embodiments, multiple scanners such as 10A, 10B are used simultaneously. In an embodiment, the scanner 10A is positioned to scan the top side of the table T and to a lesser extent floor points to the side of the table. The scanner 10B is positioned to scan mostly points beneath the table T rather than on top of the table. When the measurement points $X_T$ are registered with the measurement points $X_F$, the result is a point cloud having points distributed over three-dimensional space. From the perspective of a viewer V, such a collection of sparsely located points may not clearly indicate which points are closer to the viewer and which are farther from the viewer. Hence a display of the collected points in the point cloud may intersperse the floor points and the tabletop points, with the surfaces not clearly distinguished for the viewer V.

Referring now to FIGS. 4-7, with continuing reference to FIG. 1 and FIG. 2, the graphic card 32 converts the 3-D data into 2-D data (e.g., rendering data), which are displayed on the screen 34. The 3-D data are the measurement points X, wherein several scans from different positions of the laser scanner 10 can be assembled into one scene. For representing the 2-D data, there are pixels P, i.e., adjacent, small polygonal surfaces (e.g. squares or hexagons), which are arranged in a two-dimensional plane E which corresponds to the screen 34. In an embodiment, a starting point for the representation on the screen 34 is the projection of the measurement points X onto a plane E with a viewer (e.g., eye, camera), at a certain viewpoint V. The projection appears to be in perspective (i.e., the viewpoint V is in the finite) or orthographical (i.e., the viewpoint V in is the infinite). In an embodiment, the projected measurement points X are assigned to single pixels $P_0$, $P_1$, $P_2$. A Z-buffer, which is a two-dimensional array (field) of values for the pixels P. In this Z-buffer, a field element (depth z) is assigned to each pixel P. The depth z of each projected measurement point X corresponds to the distance of the measurement point X to the plane E with respect to the viewpoint V. The field of the pixels P and the Z-buffer may be treated in the same way as the images.

The viewpoint V may be arbitrary per se and is usually changed several times when regarding the scan and/or the scene. In other words, the user may elect to view the measurement point data from a variety of perspectives, with the changes to the displayed measurement points X re-rendered.

Since the measurement points X are punctiform, with gaps in between, and the pixels P usually, in the case of nearby objects O, have a higher density in the plane E than do the projections of the measurement points X, a gap-filling method is carried out to fill as many pixels P as possible for an improved visual representation for the user. In an embodiment, the graphic card 32 carries out this method by processing the 3-D data following a parallel method described further herein below, the parallel processing method based at least in part on the indication of the viewpoint V and of the plane E.

In an embodiment, initially only those pixels P are filled to which the projection of a measurement point X is assigned, i.e., which exactly cover one measurement point X, such as pixels $P_0$, $P_1$, $P_2$ for example. These pixels P are filled with the value of the assigned measurement point X, i.e., brightness (gray-scale value) and, where applicable, color. All other pixels P, which do not exactly correspond with a projection of a measurement point X, i.e., which are "in between" are empty at first, for example are set to a value of zero (e.g. empty or blank). Each of the depths z, i.e., the field elements of the Z-buffer, which are assigned to the initially filled pixels P, is set to that depth $z_0$, $z_1$, $z_2$, which corresponds to the distance of the assigned measurement point X to the plane E. In an embodiment, sometimes referred to as perspective projection, the distance z1 is marked from an object point to a point P1 on a plane E along a line directed to a viewer point V. In this embodiment, the distance z1 is the distance from the object point to point P1. In another embodiment, sometimes referred to as orthographic projection, the distance is a perpendicular distance from the object point to the point P1 rather than along the line aimed toward V.

All other field elements of the Z-buffer (e.g., depths z) are set to a very large value (relative to the scale of the measured points), for example, to approximate an infinite depth. If, when the projection of the measurement points X is made, it turns out that two measurement points X are available for one pixel P, the measurement point having the smaller depth z is selected and the other one is rejected, so that covered surfaces and covered edges, such measurement points $X_F$ on the floor of FIG. 3 for example, are not visible.

According to an embodiment, the gap-filling method is performed in dependence on the depth $z_0$, $z_1$, $z_2$, i.e., on the distance to the plane E. The graphic card 32 selects all pixels P in parallel with respect to time. By way of example, one selected pixel $P_0$ is regarded now. The assigned depth z, i.e., field element of the Z-buffer, contains the depth $z_0$. For each selected pixel $P_0$ the adjacent pixels $P_1$, $P_2$, are searched consecutively, i.e., alternating between to the left and to the right, and above and below. If the adjacent pixel $P_1$ is not yet filled or if its depth z is bigger than the depth $z_0$ of the selected pixel $P_0$, it is skipped and the second next pixel P is taken as adjacent pixel $P_1$, if necessary iteratively. If an adjacent pixel $P_1$, the depth $z_1$ of which is smaller than the depth $z_0$ of the selected pixel $P_0$, is found in one of the directions, a change to the next direction takes place, and it is looked for the adjacent pixel $P_2$ (e.g., the depth $z_2$ of which is smaller than the depth $z_0$ of the selected pixel $P_0$). It is possible to define a maximum number of skipped pixels, i.e., if the adjacent pixel P or $P_2$ is not yet found after skipping the maximum number of skipped pixels, the search for $P_1$ or $P_2$ is aborted. In one embodiment, the search for pixels to fill about an initial pixel $P_0$ is limited to those pixels within a radius R of the pixel $P_0$ on the two-dimensional pixel array. In another embodiment, the search is also limited by another radius in 3-D coordinates, perpendicular to the viewing direction.

If the adjacent pixels $P_1$ and $P_2$ to the selected pixel $P_0$ have been found in opposite directions, with the depths $z_1$ and $z_2$ of the adjacent pixels $P_1$ and $P_2$ being smaller than the depth $z_0$, it is checked whether $P_1$ and $P_2$ are on the same plane, i.e, whether the amount of the difference of $z_2$ and $z_1$ is below a threshold value for the depth $z_{crit}$, i.e., $$|z_2 - z_1| < z_{crit}$$

applies. In such a case, the selected pixel $P_0$ is filled with the value which is interpolated between $P_1$ and $P_2$, i.e., brightness (gray-scale level) and, if applicable color. The assigned field element of the Z-buffer is likewise set to the interpolated depth between $z_1$ and $z_2$. Interpolation weights depend on the distance of the selected pixel $P_0$ from $P_1$ and $P_2$ in plane E.

If the difference of the depths is too big, i.e., the condition $$|z_2 - z_1| \geq z_{crit}$$

applies, it is assumed that $P_1$ and $P_2$ are located on different planes. The selected pixel $P_0$ is then filled with the value, i.e., brightness and, if applicable color, of, for example, the more remote pixel $P_1$ or $P_2$, and the assigned field element of the Z-buffer with the bigger depth $z_1$ or $z_2$. In another embodiment, the value and the depth of pixel $P_1$ or $P_2$ having a larger depth $z_1$ or $z_2$ is transferred or assigned to the other pixel. In the case of more than two adjacent pixels $P_1$, $P_2$, the average value of the majority, i.e., of the adjacent pixels $P_1$, $P_2$, which are located on the same surface, can be transferred.

Selected pixels $P_0$, which are already filled with values of the measurement points, are overwritten by the interpolation of the values of the adjacent pixels $P_1$ and $P_2$. In another embodiment, a selected pixel $P_0$, which is already filled, remains unvaried if $|z_0 - z_1|$ is smaller than a threshold, i.e. if $P_0$ and $P_1$ already belong to the same surface.

Figure 7:
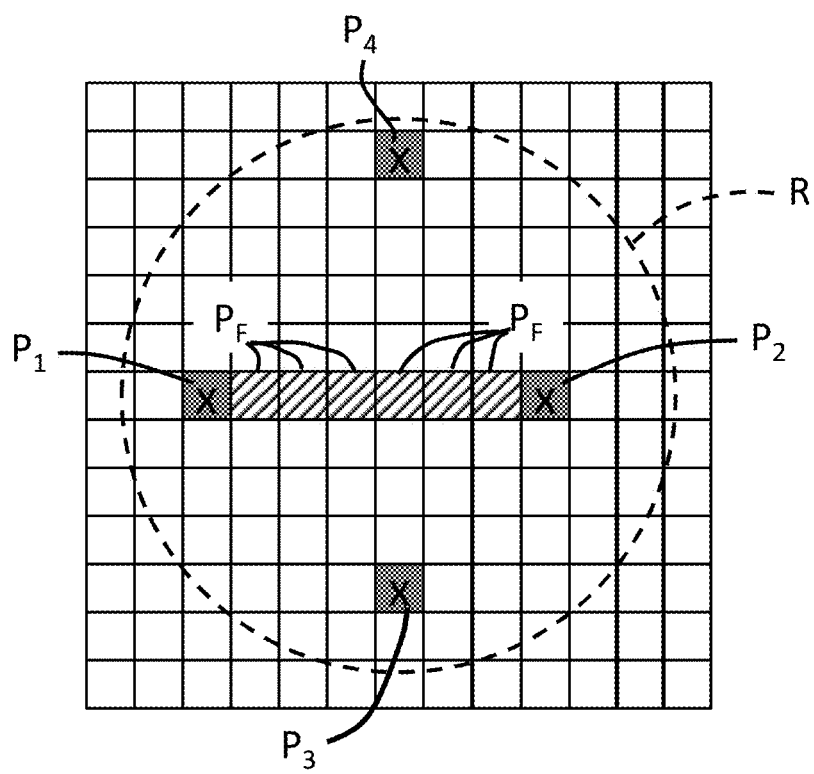
FIG. 7 is a schematic illustration of the assignment and filling of the pixels, according to FIG. 3, with a view onto the plane, in accordance with an embodiment.

If pixels P have been skipped when finding the pixels $P_1$ and $P_2$, because they were not filled or because their depth z was too big, their adjacent pixels $P_1$, $P_2$ are the same as with the selected pixel $P_0$, so that the skipped pixels $P_F$ and the assigned field elements of the Z-buffer, within the framework of the selection taking place in parallel, are likewise filled either with a value which is interpolated between the pixels $P_1$ and $P_2$ and/or the depths $z_1$ and $z_2$ (depending on the distance of the selected pixel $P_0$ from $P_1$ and $P_2$ in plane E) or with the value and/or the depth $z_1$ or $z_2$ of the more remote one among pixels $P_1$ or $P_2$ (or the average value of the majority) as shown in FIG. 7.

Due to the selection taking place in parallel, filling with the value and/or the depth $z_1$ or $z_2$ of the more remote among the pixels $P_1$ or $P_2$ on account of a difference of depths which is too big, leads to the closer-by pixel $P_1$ or $P_2$ forming an edge. Even if no adjacent pixel $P_1$ or $P_2$ is found, the depth $z_1$ or $z_2$ of which is smaller than the depth $z_0$ of the selected pixel $P_0$, since the selected pixel $P_0$ is at the side of the screen 34, an edge is generated, since these selected pixels $P_0$ at the edge are not filled then.

Once the pixels along a horizontal row are filled, the same process may be used to fill the vertical gaps between the measurement points $P_3$, $P_4$ in a similar manner to that described herein above for the horizontal gap filling. As will be discussed in more detail below, the gap-filling process may be iteratively performed until the image is created.

Gap-filling may take place in the control and evaluation device 22 or by software running on an external computer. Due to the savings in time by a parallel selection, the hardware-based gap-filling on the graphic card 32 may be used together with the programming interface of the latter.

Figure 8:
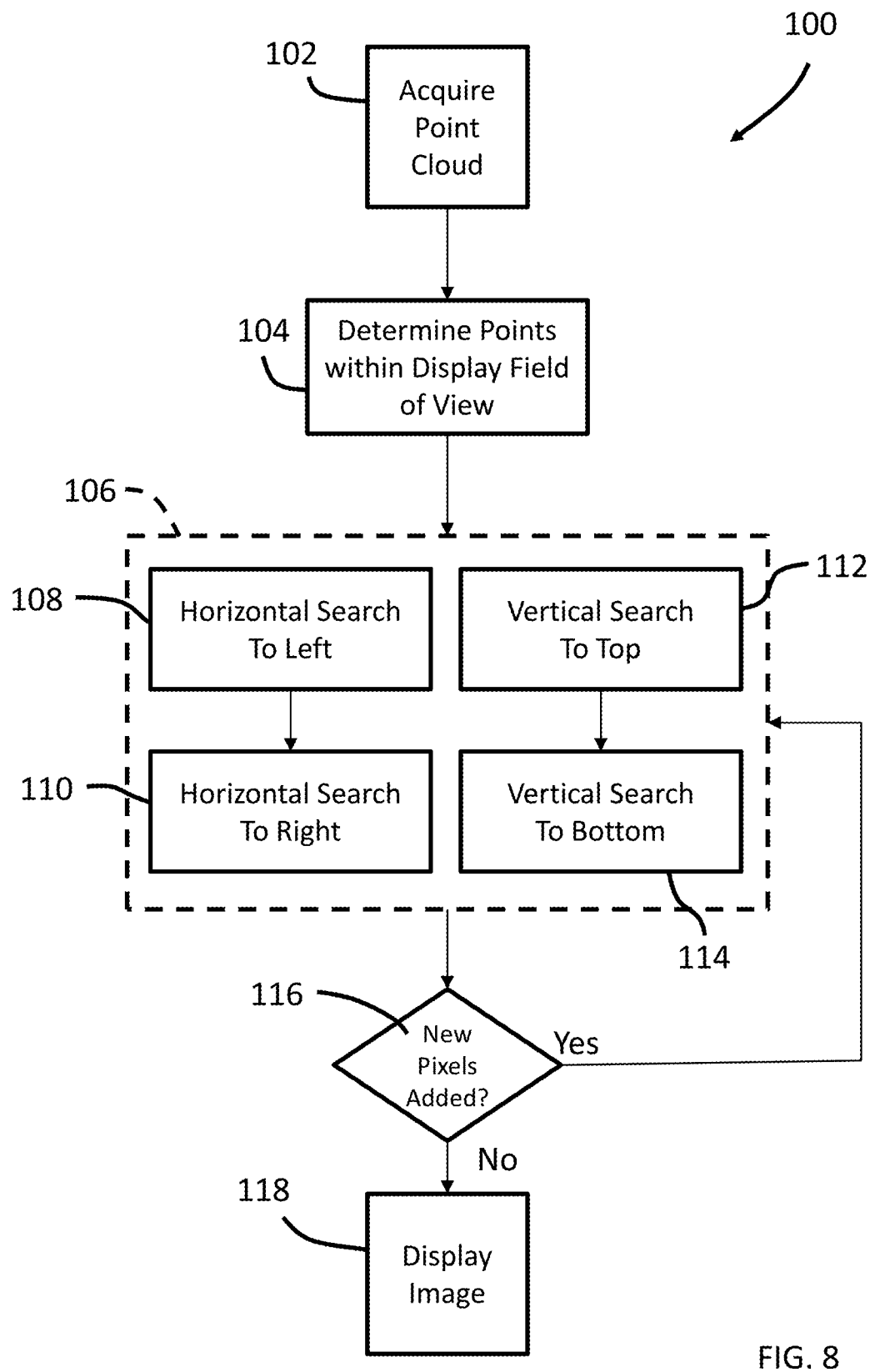
FIG. 8 is a flow diagram of a method of filling pixels in accordance with an embodiment.

Referring now to FIG. 8 an embodiment is shown of a method 100 for acquiring measurement points and displaying the point cloud using gap filling of pixels. The method 100 begins in block 102 where the object O is scanned with a metrology device, such as but not limited to a laser scanner 10 for example. It should be appreciated that the scanned object O may comprise multiple objects, such as the interior rooms and hallways of a building for example. The step of scanning the object O results in the generation of a point cloud representing measured points X on the surfaces of the object O.

The method 100 then proceeds to block 104 where it is determined which of the measured points X are visible on the display device 30. As discussed herein above the three-dimensional point cloud is projected onto the two-dimensional screen 34 of display device 30 to allow the user to view the point cloud. The method then proceeds to block 106 where the pixels are gap filled to provide the visual appearance of surfaces in the display device 30. In an embodiment, the step of gap filling in block 106 includes a horizontal search to the left of a pixel containing measured point in block 108 and then a search to the right of the pixel in block 110. The step of gap filling in block 106 further includes the steps of a vertical search above (e.g. towards the top of the display device 34) the pixel containing the measured point in block 112 and then a search below the pixel in block 114. In an embodiment, the vertical search of blocks 112, 114 follow the horizontal search of blocks 108, 110, it should be appreciated, however, that this is for exemplary purposes and the claims should not be so limited. In other embodiments, the vertical search precedes the horizontal search. In an embodiment, the vertical search is performed sequentially with the horizontal search. In another embodiment, the horizontal and vertical searches are performed simultaneously in both directions.

The gap filling steps may be performed for all of the pixels containing a measured point that are being displayed on the display device. In an embodiment, the pixel filling steps are the same as those described herein above with respect to FIGS. 4-7. Once the gap filling is performed, the method 100 then proceeds to query block 116 where it is determined whether all of the pixels have been evaluated for gap filling. As will be discussed in more detail below, gaps or empty pixels may occur in some cases where the pixel is not bounded by a pixel containing a measured point or a previously filled pixel. To resolve this issue, the gap filling of block 106 may be an iterative process. In one embodiment, the process performs for a fixed number of iterations. In another embodiment, the process performs until a stop condition is achieved. In one embodiment, the stop condition is that no additional pixels could be filled in the previous iteration.

When the query block 116 returns an affirmative, meaning that there are unevaluated pixels, the method loops back to block 106. When query block 116 returns a negative, the method 100 proceeds to block 118 where the image is displayed on the display device 30.

Figure 9:
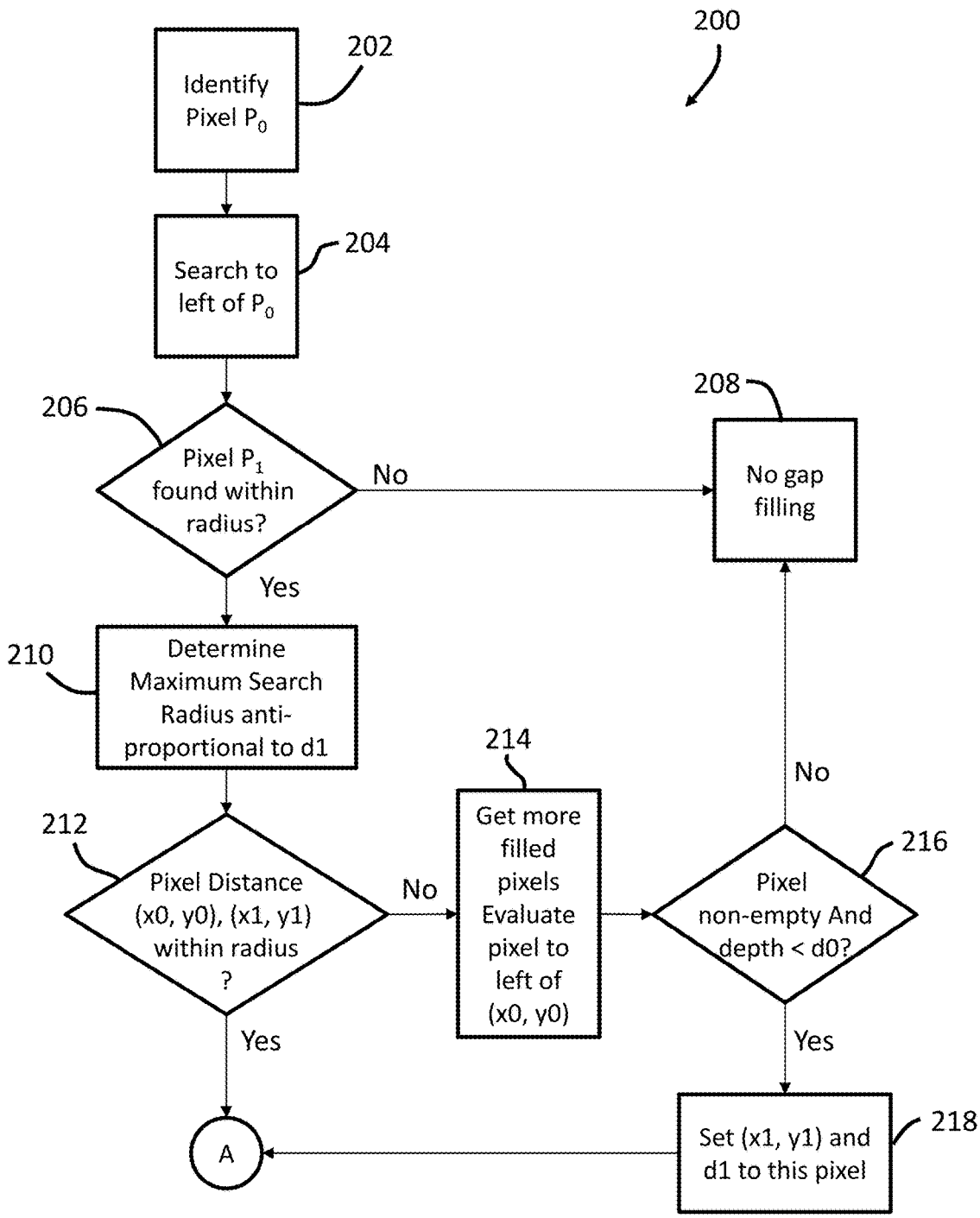
FIG. 9-FIG. 11 are flow diagrams of a method of performing a horizontal row pixel filling in accordance with an embodiment.
Figure 10:
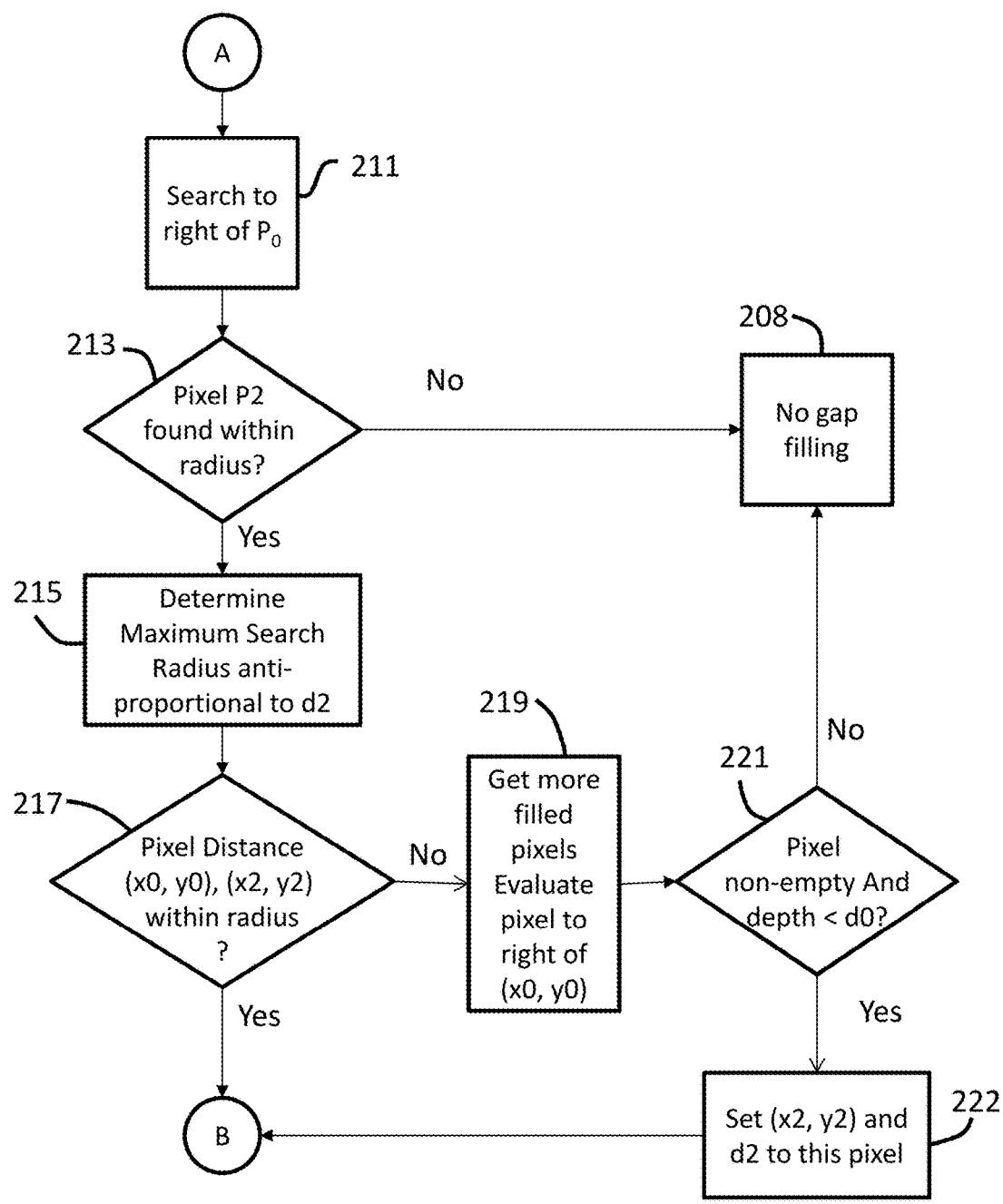
Figure 11:
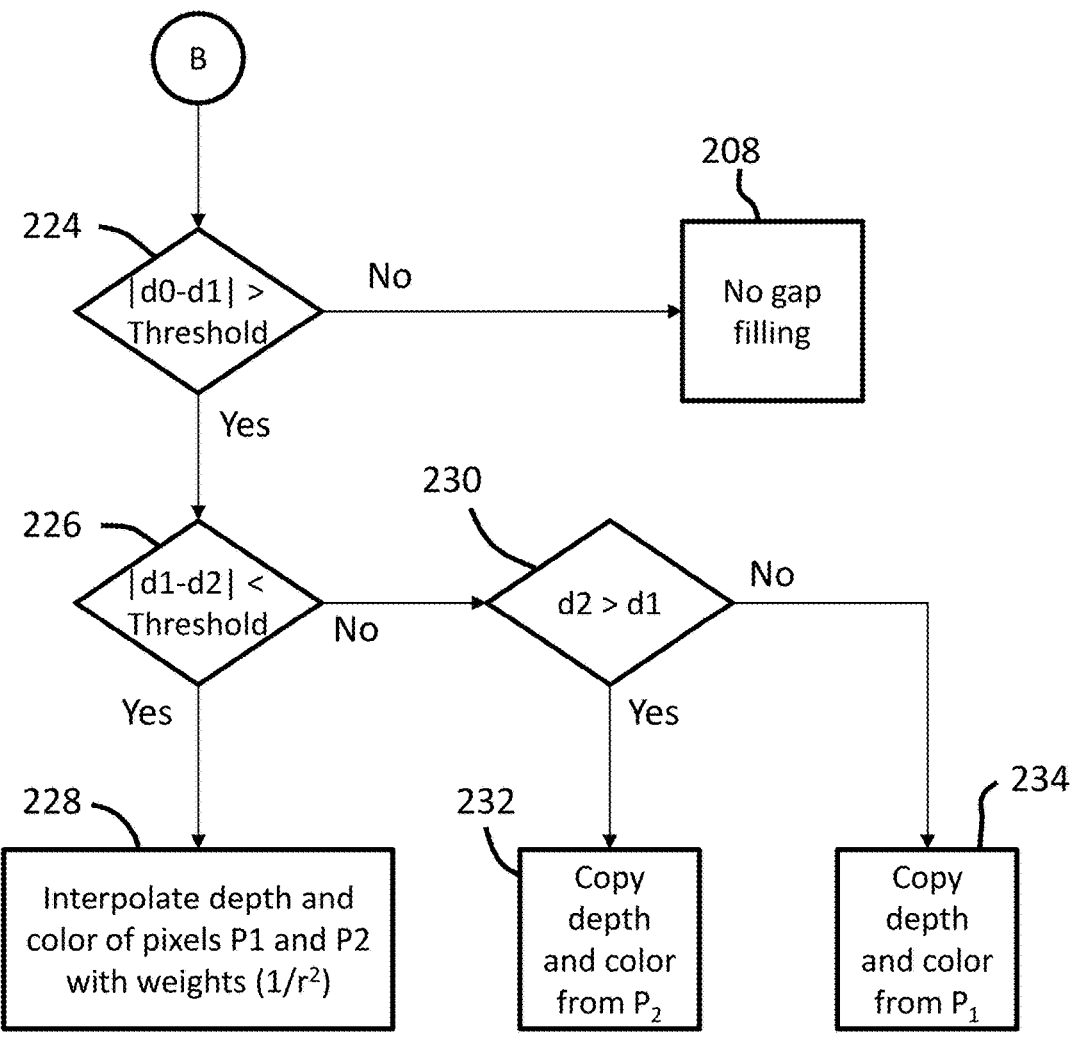

Referring now to FIGS. 9-11, an embodiment of a method 200 for the gap filling steps of blocks 108-110. It should be appreciated that while method 200 is described with reference to horizontal gap filling, this is for exemplary purposes and the steps of method 200 may also be performed for vertical gap filling as well.

The method 200 begins in block 202 where a pixel $P_0$ is identified. The pixel $P_0$ is a pixel that contains an image of the measured point X that is projected from the three-dimensional point cloud onto the two-dimensional display device 30. The method 200 then proceeds to block 204 where a search is performed of pixels to the left of the pixel $P_0$. As used herein, the terms "left" and "right" indicate opposite sides in the row of pixel $P_0$, this is done for clarity purposes and no intended orientation of the display device 34 or the point cloud data is intended.

The method 200 then proceeds to query block 206 where it is determined if a pixel $P_1$ is found within a radius R (FIG. 7). In the exemplary embodiment, the radius R is initially a predetermined value defined by the user, such as five pixels for example. When the query block 206 returns a negative (no pixel P found), the method 200 proceeds to block 208 and no gap filling is performed. When the query block 206 returns a positive (a pixel $P_1$ is found), the method proceeds to block 210 where a maximum search radius in pixels is determined where the radius is non-proportional or anti-proportional to a distance d1, where the distance d1 is the same as z1 of FIG. 4. The search is performed in pixel space. It should be appreciated that each pixel may represent a different size in 3D space. For example, if a ray extends through each pixel from the view point into space, the distance between the rays will increase with the distance or depth from the viewpoint (perspective projection). In an embodiment, the search re-projects the pixels into 3D space and objects within a predetermined distance.

The method 200 then proceeds to query block 212 where it is determined whether the distance (x0, y0), (x1, y1) is between the measured points of pixels $P_0$, $P_1$. When this distance is not within the radius determined in block 210, the query block 212 returns a negative and proceeds to block 214 where the direct neighboring pixel $P_1$ to the left of (x0, y0) is evaluated in query block 216. In query block 216, it is determined whether the pixel is non-empty and has a depth less than the depth to the measured point X of $P_0$. When query block 216 returns a negative, meaning either the pixel is empty or it has a depth greater than the measured point X of $P_0$, the method 200 loops back to block 208. When the query block 216 returns a positive, the method 200 proceeds to block 218 where the values of (x1, y1) and d1 are set to this pixel (e.g. pixel $P_1$). Once the values of block 218 are set, or when the query block 212 returns a positive, the method 200 proceeds to block 211 (FIG. 10).

In block 211, a search is performed of the pixels to the right of the pixel $P_0$. The method then proceeds to query block 213 where it is determined whether pixel P2 is within the radius R (e.g. 5 pixels). When the query block 213 returns a negative, the method 200 proceeds to block 208 and no gap filling is performed. When the query block 213 returns a positive, the a maximum search radius is determined in block 215 that is non-proportional or anti-proportional to the distance d2, where the distance d2 is equivalent to the distance z2 of FIG. 4. The method 200 then proceeds to query block 217 where it is determined if the pixel distance (x0, y0), (x2, y2) is within the radius determined in block 215.

When query block 217 returns a negative, the method 200 proceeds to block 219 where the direct neighboring pixel to the right of (x0, y0) is evaluated. This provides for more even gap filling even when the search criteria is not fulfilled. In an embodiment, for directly neighboring pixels, the 3D-criteria is ignored unless better pixels are identified. In query block 221, it is determined if the pixel is non-empty and has a depth less than the depth to the measured point X of $P_0$. When query block 221 returns a negative, meaning either the pixel is empty or it has a depth greater than the measured point X of $P_0$, the method 200 loops back to block 208 and no gap filling is performed. When the query block 221 returns a positive, the method 200 proceeds to block 222 where the values of (x2, y2) and d2 are set to this pixel (e.g. pixel $P_2$). Once the values of block 222 are set, or when the query block 217 returns a positive, the method 200 proceeds to block 224 (FIG. 11).

Figure 6:
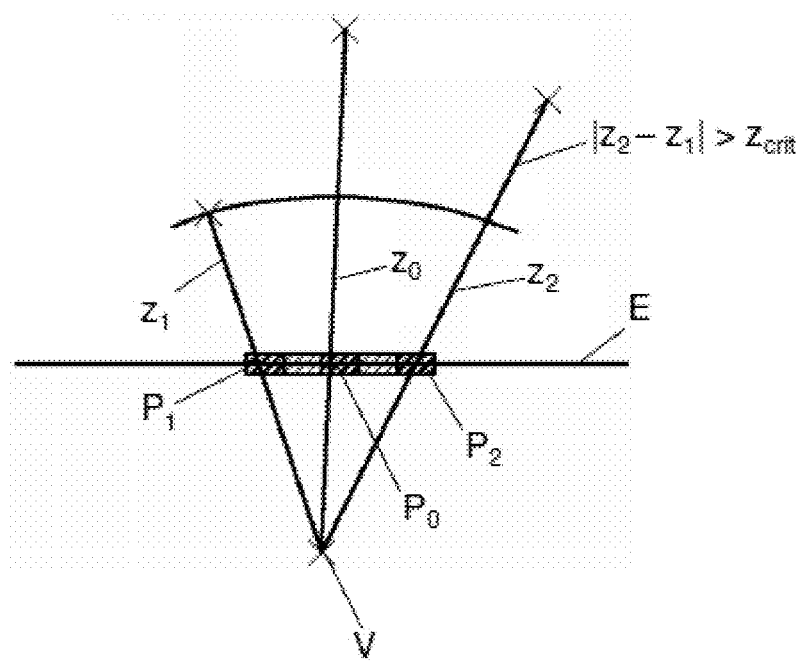
FIG. 6 is a schematic illustration of the assignment and filling of the pixels with a view onto the plane, wherein the adjacent pixels are located on different surfaces, in accordance with an embodiment.

In query block 224, it is determined if the difference between the distances d0 and d1 (e.g. the distance from the viewpoint V to the measured points x0 and x1 of FIG. 6) is greater than a threshold (e.g. $Z_{crit}$). In one embodiment, the threshold is 2.5 centimeters. When query block 224 returns a negative, indicating that that the measured points already lie on the same plane, the method 200 proceeds to block 208 and no gap filling is performed. When query block 224 returns a positive, the method 200 proceeds to query block 226 where it is determined whether the difference between the distances d1 and d2 (e.g. the distance from the viewpoint V to the measured points x1 and x2 of FIG. 6) is less than a threshold. In one embodiment, the threshold of block 226 is 10 centimeters.

When query block 226 returns a positive, meaning the difference in the depths is less than the threshold and that the points lie on the same plane, the method 200 proceeds to block 228 where the depth and color of pixels P1 and P2 is interpolated and assigned to the intermediate or intervening pixels. In one embodiment, the depth and color interpolation is weighted with weights $(1/r_1^2)$ and $(1/r_2^2)$, where $r_1$ is the distance in pixel units from P1 to P0, and $r_2$ is the distance in pixel units from P2 to P0.

When query block 226 returns a negative, the method 200 proceeds to query block 230 where it is determined if the depth d2 is greater than the depth d1. When the query block 230 returns a positive, the color and depth values from the pixel $P_2$ are used for gap filling the empty pixels between pixels $P_1$ and $P_2$. When the query block 230 returns a negative, the color and depth values from the pixel $P_1$ are used for gap filling the empty pixels between pixels $P_1$ and $P_2$. The purpose of block 230 is to avoid extending objects by additional pixels at their edges.

It should be appreciated that the method 200 may be repeated for the vertical gap filling as well.

Figure 12:
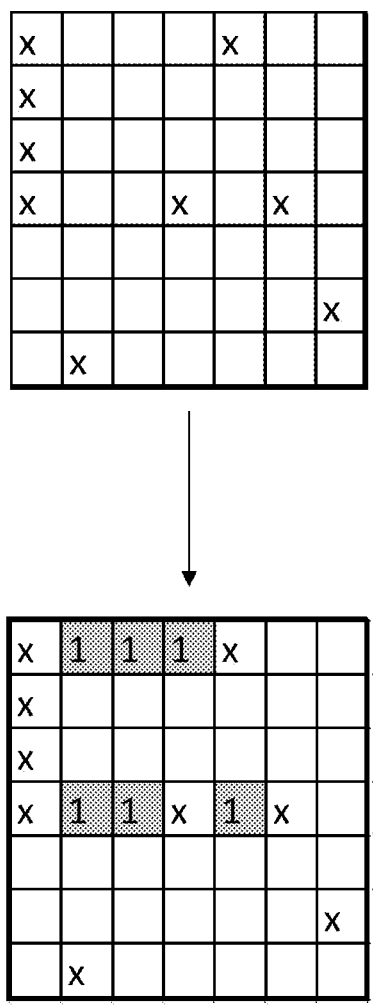

Turning now to FIGS. 12-16, an example is illustrated of the iteration steps for gap filling, such as provided by query block 116 (FIG. 8) for example. FIG. 12 illustrates the horizontal gap filling that occurs in the first iteration, the blocks with the "x" represent pixels containing a measured point. The number "1" represents empty pixels that are filled in the first iteration, such as by method 100 for example.

Figure 13:
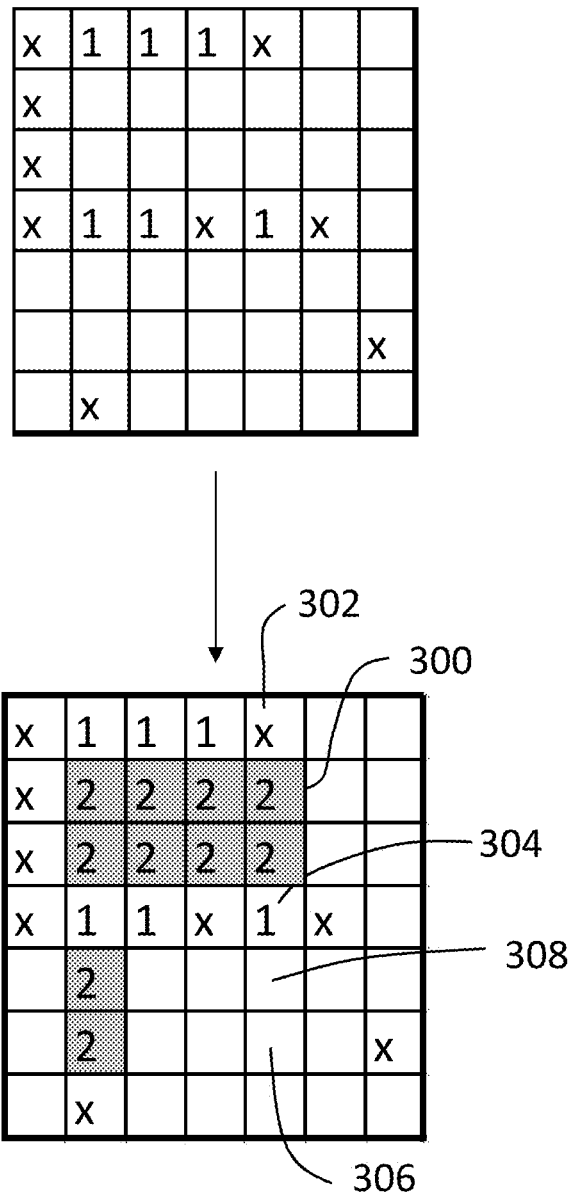

Once the horizontal gap filling is completed, the vertical gap filling is performed as shown in FIG. 13. The number "2" represents the pixels filled during the first iteration vertical gap filling. It should be noted empty pixels are only filled when they are bounded on opposite sides by either a pixel having a measurement point X or a previously filled pixel, for example pixel 300 is filled because it is bounded by the pixels 302, 304. It should further be noted that once the first iteration is completed, there are a number pixels, such as pixels 306, 308 that have not been evaluated for gap filling because at least one side of the row in which the pixel is located was unbounded at the beginning of the first iteration vertical gap filling.

Figure 14:
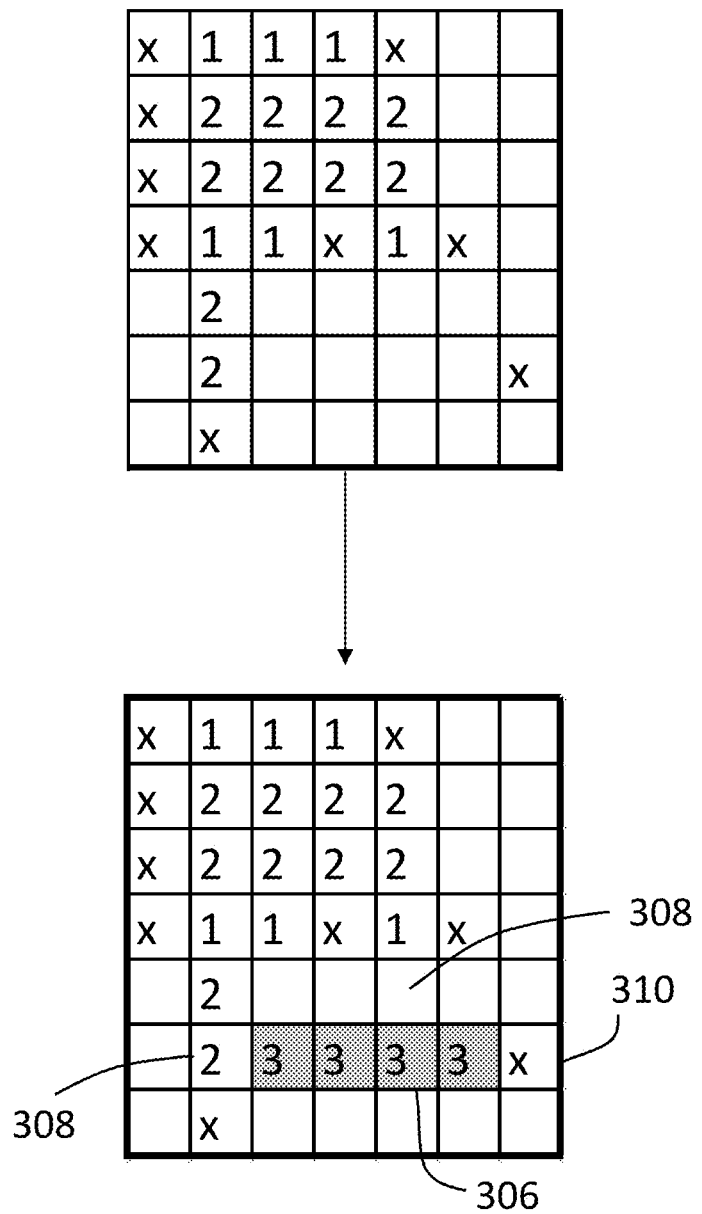
Figure 15:
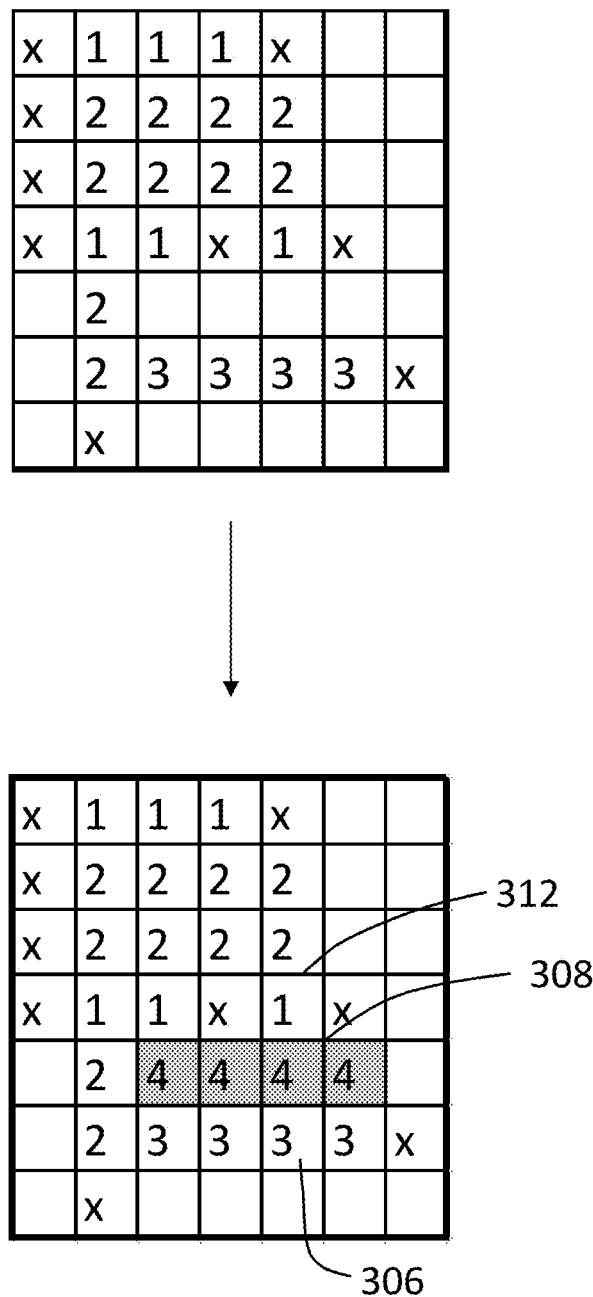

Referring now to FIG. 14 a second gap filling iteration is initiated. The second iteration starts with a horizontal gap filling. In this iteration, the pixel 306 is evaluated and filled based on the bounding or end pixels 310, 312. The number "3" represents pixels that were gap filled during the second iteration horizontal gap filling. It should be noted in an embodiment the gap filled pixels have an associated depth and color that was assigned during blocks 228, 232 or 234 of FIG. 11. This assigned depth and color allows the intermediate pixels to be evaluated and filled. With the second iteration horizontal gap filling completed, the second iteration vertical gap filling is performed as shown in FIG. 15. Here, the additional pixels are evaluated and filled (where appropriate), based on filled pixels that include those pixels filled during the second iteration horizontal gap filling. For example, pixel 308 is evaluated and filled based on end pixels 306 (filled in the second iteration horizontal gap filling) and pixel 312 (filled in the first iteration gap filling).

In the illustrated embodiment, when the second iteration vertical gap filling is completed, there remain no unevaluated bounded pixels. Therefore, the query block 116 would return a negative and the method 100 would proceed with displaying the image on the display device 34. It should be appreciated that in other embodiments, more or less iterations may be performed.

It should be appreciated that while embodiments herein describe the creation of a displayed image by a gap-filling process with respect to data acquired by a laser scanning device, this is for exemplary purposes and the claims should not be so limited. In other embodiments, the displayed image may be created using point cloud data generated by any metrology device, such as a triangulation-type laser scanner device, a triangulation-type structured light scanner device, or a time-of-flight based scanner device for example.

The invention claimed is:

1. A method for optically scanning, measuring and displaying a point cloud, the method comprising:
   emitting, by a light emitter of a laser scanner, an emission light beam;
   receiving, by a light receiver, a reflection light beam, wherein a reflection light beam of the emission light beam is reflected from an object;
   determining, by a control and evaluation device for measurement points projected on a plane corresponding to a screen on a display device, at least the distance from the object to a center of the laser scanner, wherein at least some measurement points are displayed on the display device;
   determining which points are visible on the display device based at least in part on a viewpoint of the display device; and
   gap filling one or more pixels to generate a visual appearance of a surface on the display device, wherein the gap filling includes a first horizontal search in a first direction of a first measured point of the measurement points followed by a second horizontal search in a second direction of the first measured point, the second direction being opposite the first direction and wherein the gap filling further includes a first vertical search in a third direction of the measured point, the third direction being perpendicular to the first direction, followed by a second vertical search in a fourth direction, the fourth direction being opposite the third direction.

2. The method of claim 1, further comprising:
determining if additional pixels could be filled in a horizontal or vertical gap filling step; and
repeating the gap filling of one or more pixels until it was determined that no additional pixels could be filled.

3. The method of claim 2, further comprising displaying an image having the surface on the display.

4. The method of claim 1, wherein the first horizontal search further comprises:
identifying a first pixel, either empty, or corresponding to the first measured point;
determining when a second pixel is located in the first direction is within a predetermined radius;
determining an adaptive maximum search radius that is anti-proportional to a first distance to the first measured point;
determining if the second pixel is located within the adaptive maximum search radius; and
determining a second distance of the second pixel.

5. The method of claim 4, wherein the second horizontal search further comprises:
identifying a third pixel is located within the predetermined radius;
determining if the third pixel is located within the same adaptive maximum search radius; and
determining a third distance of the third pixel.

6. The method of claim 5, wherein the gap filling further comprises:
determining the difference between the first distance and the second distance is less than a threshold;
determining the difference between the second distance and the third distance is less than a threshold; and
assigning a depth and color to the first pixel by interpolating depth and color of the second pixel and the third pixel.

7. The method of claim 6, wherein the interpolation is weighted.

8. The method of claim 7, wherein the weighting is $1/r_1^2$ and $1/r_2^2$ wherein $r_1$ is the distance in pixel units from the second to the first pixel, and $r_2$ is the distance in pixel units from the third to the first pixel.

9. The method of claim 5, wherein the gap filling further comprises:
determining the difference between the first distance and the second distance is less than a threshold;
determining the difference between the second distance and the third distance is greater than a threshold;
determining the third distance is greater than the second distance; and
assigning the depth and color of the third pixel to the first pixel.

10. The method of claim 5, wherein the gap filling further comprises:
determining the difference between the first distance and the second distance is less than a threshold;
determining the difference between the second distance and the third distance is greater than a threshold;
determining the third distance is less than the second distance; and
assigning the depth and color of the second pixel to the first pixel.

* * * * *